United States Patent [19]
Rakov

[11] Patent Number: 5,734,580
[45] Date of Patent: Mar. 31, 1998

[54] METHOD OF INTERCONNECTING NODES AND A HYPERSTAR INTERCONNECTION STRUCTURE

[76] Inventor: Mikhail A. Rakov, 1028 Marcussen Dr., Menlo Park, Calif. 94025

[21] Appl. No.: 614,508

[22] Filed: Mar. 13, 1996

[51] Int. Cl.$^6$ .......................... G06F 17/50; G06F 15/00
[52] U.S. Cl. ...................... 364/488; 395/200.01
[58] Field of Search ........................ 364/488, 491, 364/489, 490; 395/200.01, 200.02, 200.21

[56] References Cited

PUBLICATIONS

Day et al., "A Comparative Study of Topological Properties of Hypercubes and Star Graphs," IEEE Trans. on Parallel and Distributed Systems, vol. 5, No. 1, Jan. '94, 31–38.
Misic et al., "Communication Aspects of the Star Graph Interconnection Network," IEEE Trans. on Parallel and Distributed Systems. vol. 5, No. 7, Jul. '94, 678–687.
M.A. Rakov, "Multiple–valued Representation of Information and Organization of Interconnections in the Computer Structures and Systems", *Problems of Radioelectronics*, v. 7, Series EVT, 1985, pp. 141–148 (Russian).
V.L. Kouznetsova, M.A. Rakov, *Self–organization in Technical Systems*, Kiev, Naukova Dumka, 1987, pp. 156–173 (Russian).
M.A. Rakov, O.A. Vakulskiy, "Computer Systems Design Using Apparatus of the Ideal Ring Proportions", *Theses of the International Conference on New Information Technologies*, Voronezh Polytechnic Institute, 1992, pp. 77–78 (Russian).
"using the Ideal Code Proportion Apparatus for Improving of the Local Nets Main Characteristics", *Proceedings of the International Seminar on Local–Area Networks*, Riga, IEVT, 1992, pp. 31–36 (Russian).
James Singer, "A Theorem in Finite Projective Geometry and Some Applications to Number Theory", May 1938, pp. 377–385.

*Primary Examiner*—Kevin J. Teska
*Assistant Examiner*—Leigh Marie Garbowski
*Attorney, Agent, or Firm*—Edward B. Weller; Oblon, Spivak, McClelland, Maier & Neustadt, P.C.

[57] ABSTRACT

An interconnection structure includes a plurality of nodes and a plurality of information elements. The plurality of nodes are arranged in a regular array having a preselected number N columns and having a preselected number S rows. The preselected number N equals $n^2+n+1$, where n is the order of a Perfect Difference Set of the integers $\{d_0, d_1, \ldots d_n\}$. Each node is coupled to nodes in the previous row and the subsequent row according to a diagram of interconnections. In particular, each node $(s,j)$ is coupled to nodes $(s-1, [j+d_i](\text{Mod } N))$ for $i=0, 1, \ldots, n$; and each node $(s,j)$ is coupled to nodes $(s+1,[j+d_i](\text{Mod } N))$ for $i=0, 1, \ldots, n$. In a method of interconnecting a plurality of nodes, an order n is selected. A Perfect Difference Set comprising the set of $\{d_0, d_1, \ldots d_n\}$ is selected. A plurality of nodes are arranged in a regular array having a preselected number N columns and having a preselected number S rows, the preselected number $N=n^2+n+1$. Each node $(s,j)$ is coupled to nodes $(s-1, [j+d_i](\text{Mod } N))$ for $i=0, 1, \ldots, n$. Each node $(s,j)$ is coupled to nodes $(s+1, [j+d_i](\text{Mod } N))$ for $i=0, 1, \ldots, n$. Information elements are coupled to any of the nodes $(s,j)$, for $s=0, 1, \ldots, S$ and $j=0, 1, \ldots, N-1$.

12 Claims, 5 Drawing Sheets

METHOD OF INTERCONNECTING NODES AND A HYPERSTAR INTERCONNECTION STRUCTURE

BACKGROUND OF THE INVENTION

1. Field of the Invention

The invention relates to interconnecting nodes and information elements in electronic, computer, and communication systems (for example, cells on an integrated circuit, modules in a multiprocessor system, or subscribers to a telecommunications network). Because of the general character of the topology that is the foundation of the proposed method and of the resulting structure, it can be used in hardware as well as in software architecture design.

2. Description of Background Art

Optimizing node interconnections is very important for modem electronic, computer, and communication systems. One of the most effective and general architectures of nodes interconnections is based on a full graph diagram in which each node is connected to every other node. A straightforward implementation of this architecture, however, cannot be realized practically in devices because of the very large number of interconnecting lines between nodes.

Numerous attempts to solve both this problem and the problems of the number and the complexity of the switching elements, delay time, etc. were not successful. For example, the well known hypercube architecture diminishes the number of interconnecting lines, but increases the delay time of information exchanges.

The hypercube architecture has many other disadvantages. Particularly, k-dimensional hypercubes have $N=2^k$ vertices, so these structures are restricted to having exactly $2^k$ nodes. Because structure sizes must be a power of 2, there are large gaps in the sizes of systems that can be built with the hypercubes. This severely restricts the number of possible nodes.

A hypercube architecture has a delay time approximately equal to 2 log N, and has a "skew", i.e., different delay times for different interconnecting nodes. This creates additional difficulties when using hypercube structures in system designs.

Similar problems are characteristic of other known methods of interconnection and corresponding types of architectures (bus, ring, etc.). Detailed descriptions of the interconnection structures mentioned above and their main characteristics can be found in H. Sullivan and T. Bashkov, "A large scale, homogenous, fully distributed parallel machine, 1." Proc. 4 Symp. Comp. Arch., 1977, pp. 105–117 and in T. L. Casavant, P. Tvrdík, F. Plašil, Parallel computers: theory and practice, IEEE Computer Society Press, Los Alamitos, Calif., 1995, 422 pp., the subject matter of both are incorporated herein by reference. Neither one of these architectures, however, can ensure an optimal solution to the interconnection problems.

Consequently, there is a need to develop an interconnecting method and structure that lacks the above-described shortcomings of known architectures.

SUMMARY OF THE INVENTION

The present invention provides a method for interconnecting a plurality of nodes. The plurality of nodes are arranged in a regular array having a preselected number N columns and having a preselected number S rows. The nodes in one row are interconnected to nodes in the previous row and the subsequent row using relationships based on hyperspace, Galois fields, and Perfect Difference Sets. An order n is selected for a Perfect Difference Set, which includes the set of integers $\{d_0, d_1, \ldots, d_n\}$. The preselected number N equals $n^2+n+1$. Each node (s,j) is coupled to nodes (s−1, [j+$d_i$](Mod N)) for i=0, 1, ..., n. Each node (s,j) is coupled to nodes (s+1, [j+$d_i$] (Mod N)) for i=0, 1, ..., n. Information elements are coupled to nodes (s, j), for s=0, 1, S, and j=0, 1, ..., N−1.

The present invention also provides an interconnection structure that includes a plurality of connecting lines and a plurality of nodes arranged in a regular array having a preselected number N columns and having a preselected number S rows. Each node (s,j) is coupled to nodes (s−1, [j+$d_i$](Mod N)), for i=0, 1, ..., n, and is coupled to nodes (s+1, (j+$d_i$)(Mod N)), for i=0, 1, ..., n. The integers $d_i$ are components of a Perfect Difference Set of order n. The preselected number N of columns equals $n^2+n+1$. The interconnection structure also includes a plurality of information elements, each of the plurality of information elements is coupled to any of the nodes (s,j), for s=1, 2, ..., S and j=0, 1, ..., N−1. The connecting lines couple nodes together and couple nodes and information elements.

The nodes may be hierarchical nodes (substructures of different levels) with an order of the node less than or equal to the number of inputs of the structure of the higher order.

The interconnection structure may be a bipartite interconnection structure that includes a plurality of connecting lines and a preselected number 2N of information elements, and includes a plurality of nodes arranged in a regular array having the preselected number N of columns and having three rows. Each node (0,j) of the first row is coupled to one of the plurality of information elements by a connecting line. Each node (1,j) of the second row is coupled to the nodes ([j+$d_i$](Mod N)) of the first and third rows for i=0, 1, ..., n. Each node (2,j) of the third row is coupled to one of the plurality of information elements by a connecting line. The connecting lines couple nodes together and couple nodes and information elements.

The interconnection structure may be a complete hyperstar interconnection structure in which the nodes of row 0 and row S (i.e. the first and last rows) are integral and form a bi-directional node. Likewise, the information elements include both transmitters and receivers and are each coupled to one of the bi-directional nodes.

DETAILED DESCRIPTION OF THE PREFERRED EMBODIMENT

Figure 1:
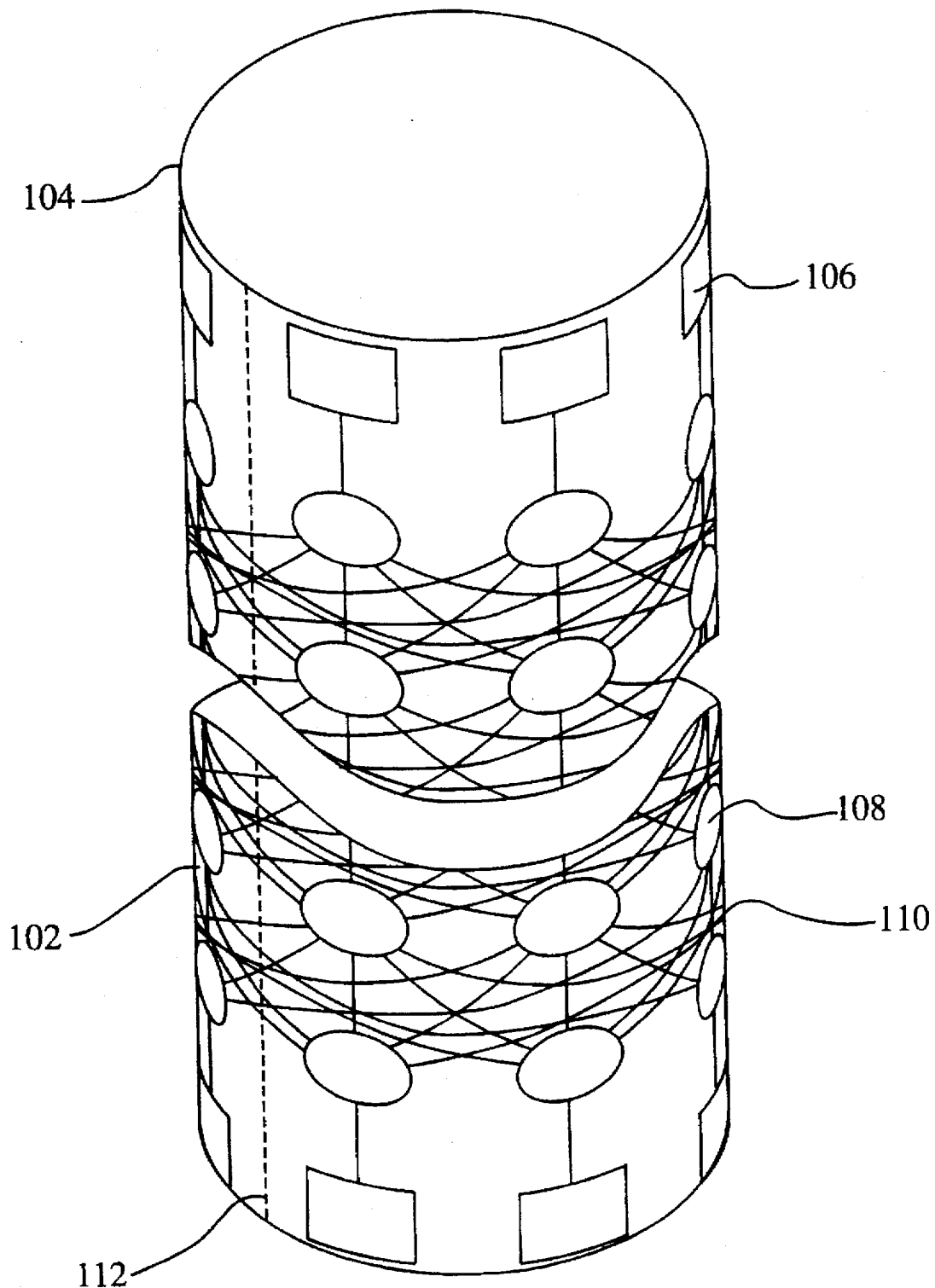
FIG. 1 is a perspective view illustrating an interconnection structure arranged on a cylindrical surface.
Figure 2:
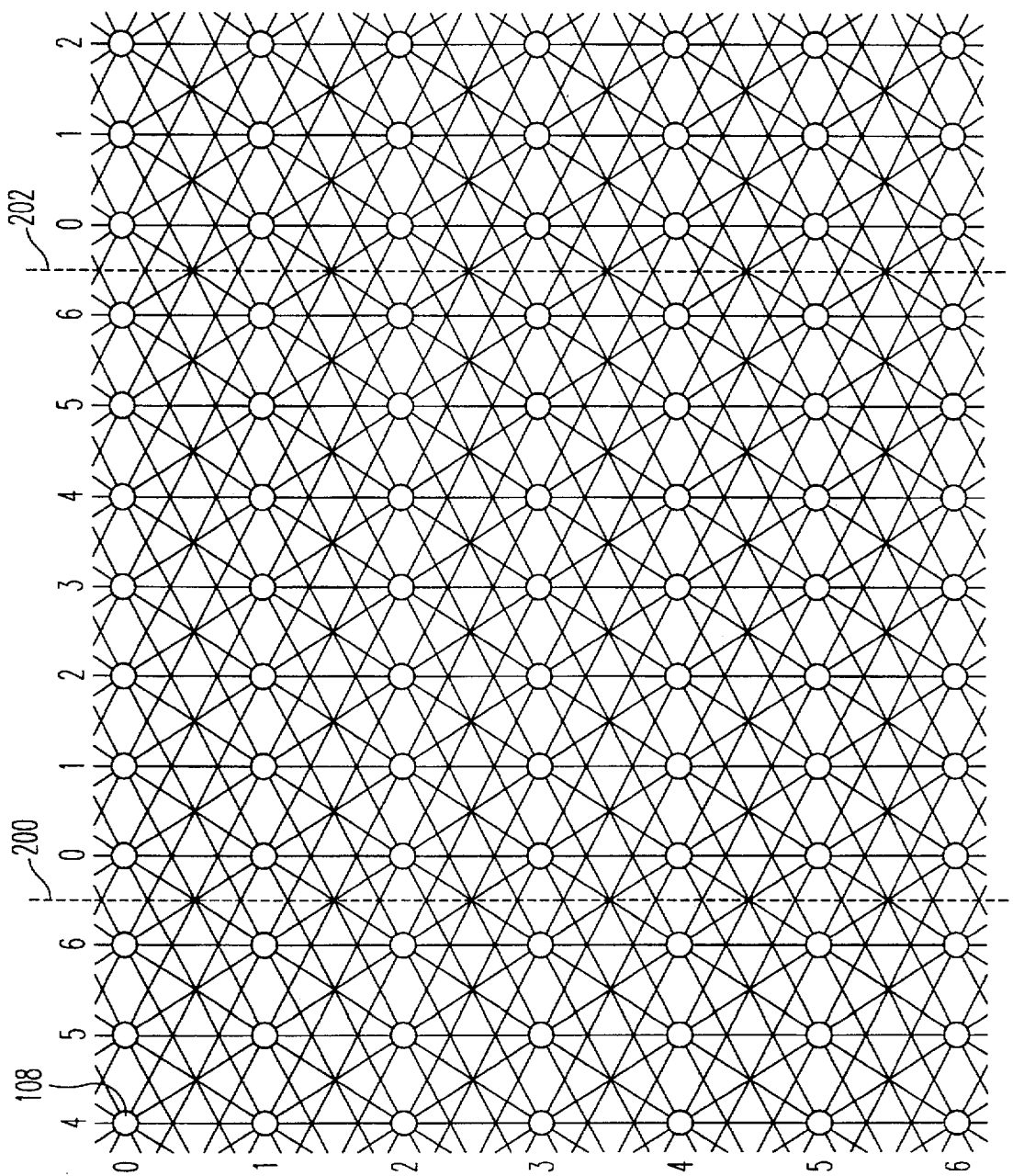
FIG. 2 is a block diagram illustrating the interconnection structure of FIG. 1 in a two-dimensional view.

Referring to FIG. 1, there is shown a perspective view illustrating an interconnection system 100 that includes an interconnection structure 102 arranged on a cylindrical surface 104. Referring to FIG. 2, there is shown a block diagram illustrating the interconnection structure 102 in a two-dimensional view. The interconnection structure 102 includes a plurality of information elements 106, a plurality of nodes 108, and a plurality of connecting lines 110. For clarity, not all of the information elements 106, the nodes 108, and the connecting lines 110 are labeled in FIGS. 1–2. Also for clarity, the following symbols are used in the figures: nodes 108 are shown as circles; information elements 106 are shown as squares; and connecting lines 110 are shown as lines coupling nodes 108 together or as lines coupling nodes 108 and information elements 106.

Referring in particular to FIG. 2, the nodes 108 of the interconnection structure 102 of FIG. 1 are shown in FIG. 2 in a linear configuration cut along a line 112 (FIG. 1) and repeated, so that all nodes 108 to the left of a left broken line 200, and to the right of a right broken line 202 are the same nodes 108 with corresponding numbers that are between the lines 200 and 202. For clarity, FIG. 2 does not show the information elements 106.

The nodes 108 are arranged in a regular array of a preselected number N of columns and a preselected number S of rows. The nodes 108 may be, for example, switching circuits or interconnection circuits, such as crossbar switches. The information elements 106 may be, for example, transmitters or receivers or both. The connecting lines 110 may be, for example, circuit traces on an integrated circuit or communication lines.

The interconnection structure and the method of interconnecting of the present invention use hyperspace, Galois fields, and Perfect Difference Sets (PDS). Perfect Difference Sets were first introduced in J. Singer, "A theorem in finite projective geometry and some applications to number theory," *Trans. Amer. Math. Soc.*, v. 43, 1938, pp. 377–385, the subject matter of which is incorporated herein by reference, and were later developed in numerous works on group theory, finite projective geometries and number theory, particularly in M. Hall, Jr. *The theory of groups*, 2nd ed., Chelsea Publishing Company, N.Y., 1976, 340 pp., the subject matter of which is incorporated herein by reference.

A Perfect Difference Set of n-th order is a collection of integers $$\{d_0, d_1, d_2, \ldots, d_i, \ldots, d_n\} \quad (1)$$

having some special properties. This collection of integers is cyclically organized (i.e., $d_0$ and $d_n$ are considered as being consecutive):

$$\ldots d_n, d_0, d_1, \ldots d_i, \ldots, d_n, d_0, \ldots$$

Operations over the elements of the Perfect Difference Set are performed using modulo N arithmetic, where the base N of the modulo operator is determined by the equation:

$$N = n^2 + n + 1, \quad (2)$$

where n is the order of the Perfect Difference Set. Because they are based on an augmented Galois fields {GF(n) fields}, Perfect Difference Sets exist for every order n:

$$n = p^r, \quad (3)$$

where p is a prime number and r is an integer.

The Perfect Difference Set establishes the interconnections in the method and structure of the present invention, and the structure can be constructed for every prime power $n=p^r$. This provides a large advantage over the hypercube architecture, where structures exist only for the powers of 2.

Both of these approaches use hyperspace, but the hyperspace construction used in the present invention is more flexible than the one used in hypercubes. As a result, a new architecture (which can be called hyperstar) is revealed, which lacks many of the limitations and disadvantages of a hypercube architecture.

For example, the values of the order n for which an interconnection structure can be constructed in a hyperstar architecture are:

2, 3, 4, 5, 7, 8, 9, 11, 13, 16, 19, 23, 25, 27, 29, 31, 32, . . .

In contrast, for a hypercube architecture, in the same interval, construction exists only for the values of n:

2, 4, 8, 16, 32, . . .

Table I shows examples of the Perfect Difference Set for several orders of sets.

TABLE I

| n | N | PDS |
|---|---|---|
| 2 | 7 | {0,1,3} |
| 3 | 13 | {0,1,3,9} |
| 3 | 13 | {0,1,4,6} |
| 4 | 21 | {0,1,4,14,16} |
| 5 | 31 | {0,1,3,8,12,18} |
| 5 | 31 | {0,1,4,6,13,21} |
| 5 | 31 | {0,1,8,11,13,17} |
| 7 | 57 | {0,1,3,13,32,36,43,52} |

Methods for constructing Perfect Difference Sets are well known and are described in M. Hall, Jr., "A survey of difference sets," *Proc. Amer. Math. Soc.*, v. 7, 1956, pp. 975–986 and in M. Sverdlik, "Optimal discrete signals" (in Russian), *Soviet Radio*, Moscow, 1975, 200 pp., the subject matter of both is incorporated herein by reference.

Referring again to FIGS. 1–2, the nodes 108 are coupled to other nodes 108 by the connecting lines 110 according to a diagram of interconnections (described below), which in turn is based on the Perfect Difference Set (described above). The nodes 108 in each row of the array are numbered as nodes 0 through N−1. Each j-th node 108 (for j=0, 1, . . . , N−1) is coupled to groups of (n+1) nodes 108 in the subsequent row and in the preceding row according to the expression:

$$[j+d_i](\bmod N) \quad (3)$$

for i=0, 1, . . . , n, and where $d_i$ are elements of a Perfect Difference Set of order n.

The diagram of interconnections of the nodes 108 is a matrix of dimensions (n+1)×N. The elements of the matrix are calculated using equation (3) and j is the number of the node 108 in the regular array and i is the number of the component of the Perfect Difference Set. Tables II through V are examples of the diagrams of interconnections. For example, in the interconnection structure of Table 11, for each row, the fifth node 108 (j=5) is coupled to nodes 108 for j=5,j=6 and j=1, in the subsequent and preceding rows (as indicated in the row of Table II that is in bold numbers).

Table II shows the interconnections for an n=2, N=7, PDS={0, 1, 3} structure.

TABLE II

| j | i | 1 | 2 | 3 |
|---|---|---|---|---|
| 0 | | 0 | 1 | 3 |
| 1 | | 1 | 2 | 4 |

TABLE II-continued

| j | i | 1 | 2 | 3 |
|---|---|---|---|---|
| 2 |   | 2 | 3 | 5 |
| 3 |   | 3 | 4 | 6 |
| 4 |   | 4 | 5 | 0 |
| 5 |   | 5 | 6 | 1 |
| 6 |   | 6 | 0 | 2 |

Table III shows the interconnections for an n=3, N=13, PDS={0, 1, 3, 9} structure.

TABLE III

| j | i | 1 | 2 | 3 | 4 |
|---|---|---|---|---|---|
| 0 |   | 0 | 1 | 3 | 9 |
| 1 |   | 1 | 2 | 4 | 10 |
| 2 |   | 2 | 3 | 5 | 11 |
| 3 |   | 3 | 4 | 6 | 12 |
| 4 |   | 4 | 5 | 7 | 0 |
| 5 |   | 5 | 6 | 8 | 1 |
| 6 |   | 6 | 7 | 9 | 2 |
| 7 |   | 7 | 8 | 10 | 3 |
| 8 |   | 8 | 9 | 11 | 4 |
| 9 |   | 9 | 10 | 12 | 5 |
| 10 |   | 10 | 11 | 0 | 6 |
| 11 |   | 11 | 12 | 1 | 7 |
| 12 |   | 12 | 0 | 2 | 8 |

Table IV shows the interconnections for an n=3, N=13, PDS={0, 1, 4, 6} structure.

TABLE IV

| j | i | 1 | 2 | 3 | 4 |
|---|---|---|---|---|---|
| 0 |   | 0 | 1 | 4 | 6 |
| 1 |   | 1 | 2 | 5 | 7 |
| 2 |   | 2 | 3 | 6 | 8 |
| 3 |   | 3 | 4 | 7 | 9 |
| 4 |   | 4 | 5 | 8 | 10 |
| 5 |   | 5 | 6 | 9 | 11 |
| 6 |   | 6 | 7 | 10 | 12 |
| 7 |   | 7 | 8 | 11 | 0 |
| 8 |   | 8 | 9 | 12 | 1 |
| 9 |   | 9 | 10 | 0 | 2 |
| 10 |   | 10 | 11 | 1 | 3 |
| 11 |   | 11 | 12 | 2 | 4 |
| 12 |   | 12 | 0 | 3 | 5 |

Table V shows the interconnections for an n=4, N=21, PDS={0, 1, 4, 14, 16} structure.

TABLE V

| j | i | 1 | 2 | 3 | 4 | 5 |
|---|---|---|---|---|---|---|
| 0 |   | 0 | 1 | 4 | 14 | 16 |
| 1 |   | 1 | 2 | 5 | 15 | 17 |
| 2 |   | 2 | 3 | 6 | 16 | 18 |
| 3 |   | 3 | 4 | 7 | 17 | 19 |
| 4 |   | 4 | 5 | 8 | 18 | 20 |
| 5 |   | 5 | 6 | 9 | 19 | 0 |
| 6 |   | 6 | 7 | 10 | 20 | 1 |
| 7 |   | 7 | 8 | 11 | 0 | 2 |
| 8 |   | 8 | 9 | 12 | 1 | 3 |
| 9 |   | 9 | 10 | 13 | 2 | 4 |
| 10 |   | 10 | 11 | 14 | 3 | 5 |
| 11 |   | 11 | 12 | 14 | 3 | 5 |
| 12 |   | 12 | 13 | 16 | 5 | 7 |
| 13 |   | 13 | 14 | 17 | 6 | 8 |
| 14 |   | 14 | 15 | 18 | 7 | 9 |
| 15 |   | 15 | 16 | 19 | 8 | 10 |
| 16 |   | 16 | 17 | 20 | 9 | 11 |
| 17 |   | 17 | 18 | 0 | 10 | 12 |
| 18 |   | 18 | 19 | 1 | 11 | 13 |
| 19 |   | 19 | 20 | 2 | 12 | 14 |
| 20 |   | 20 | 0 | 3 | 13 | 15 |

The interconnection structure includes a plurality of nodes and a plurality of connecting lines 110. The plurality of nodes is arranged in a regular array having a preselected number N columns and having a preselected number S rows. Each node (s,j) is coupled to nodes (s−1, [j+d$_i$](Mod N)) by n+1 connecting lines 110, for i=0, 1, . . . , n, and also is coupled to nodes (s+1, (j+d$_i$)(Mod N)) by n+1 connecting lines 110, for i=0, 1, . . . , n. The d$_i$ are components of a Perfect Difference Set of order n and the number of preselected number N of columns equals $n^2+n+1$.

As described below, the nodes 108 may be substructures that also are generated from the diagram of interconnections or may be simpler interconnections.

The topology of the interconnection structure 102 does not depend on the concrete physical nature of the signals (messages) and technical means (connecting lines, switches etc.). It can be applied to the solving of hardware as well as software organization problems in electronics and communication, in transport problems, and so on. In the case of software, information elements, nodes and connecting lines may represent, for example, objects, entities, vertices and connections, relationships, and edges.

Figure 3:
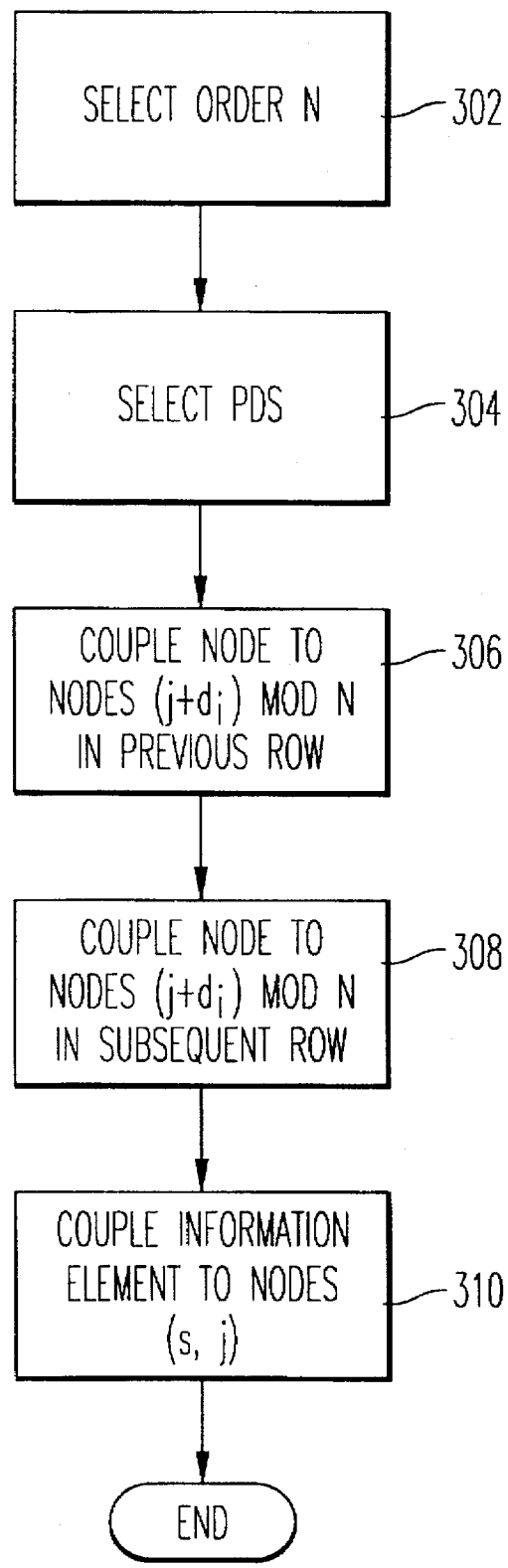
FIG. 3 is a flowchart illustrating the interconnecting of nodes and information elements.

Referring to FIG. 3, there is shown a flowchart illustrating the interconnecting of nodes 108 and information elements 106. An order n of the interconnection structure is selected (block 302). The order n may be user selected or selected in a predefined manner. A Perfect Difference Set of order n and comprising the set of integers {d$_0$, d$_1$, . . . d$_n$} is selected (block 304). The Perfect Difference Set may be user selected or selected in a predefined manner. A plurality of nodes 108 are arranged in a regular array having a preselected number N columns and having a preselected number S rows (block 306). The preselected number N equals $n^2+n+1$. The number N preferably is greater than the number of inputs to the structure. The preselected number S is a number that is determined by the required total number of information elements for a specific application.

Each node 108 is designated in a conventional format by the row s and the column j as node (s,j). Each node 108 (s,j) is coupled to nodes 108 (s−1, [j+d$_i$](Mod N)) for i=0, 1, . . . , n by n+1 connecting lines 110. Likewise, each node (s,j) is coupled to nodes 108 (s+1, [j+d$_i$](Mod N)) for i=0, 1, . . . , n by n+1 connecting lines 110. The nodes 108 and the connecting lines 110 form the interconnection structure 102.

Information elements 106 are coupled to corresponding nodes (s,j), for s=0, 1, . . . , S, and j=0, 1, . . . , N−1 (block 308). Of course some nodes 108 may not be coupled to information elements 106.

Figure 4:
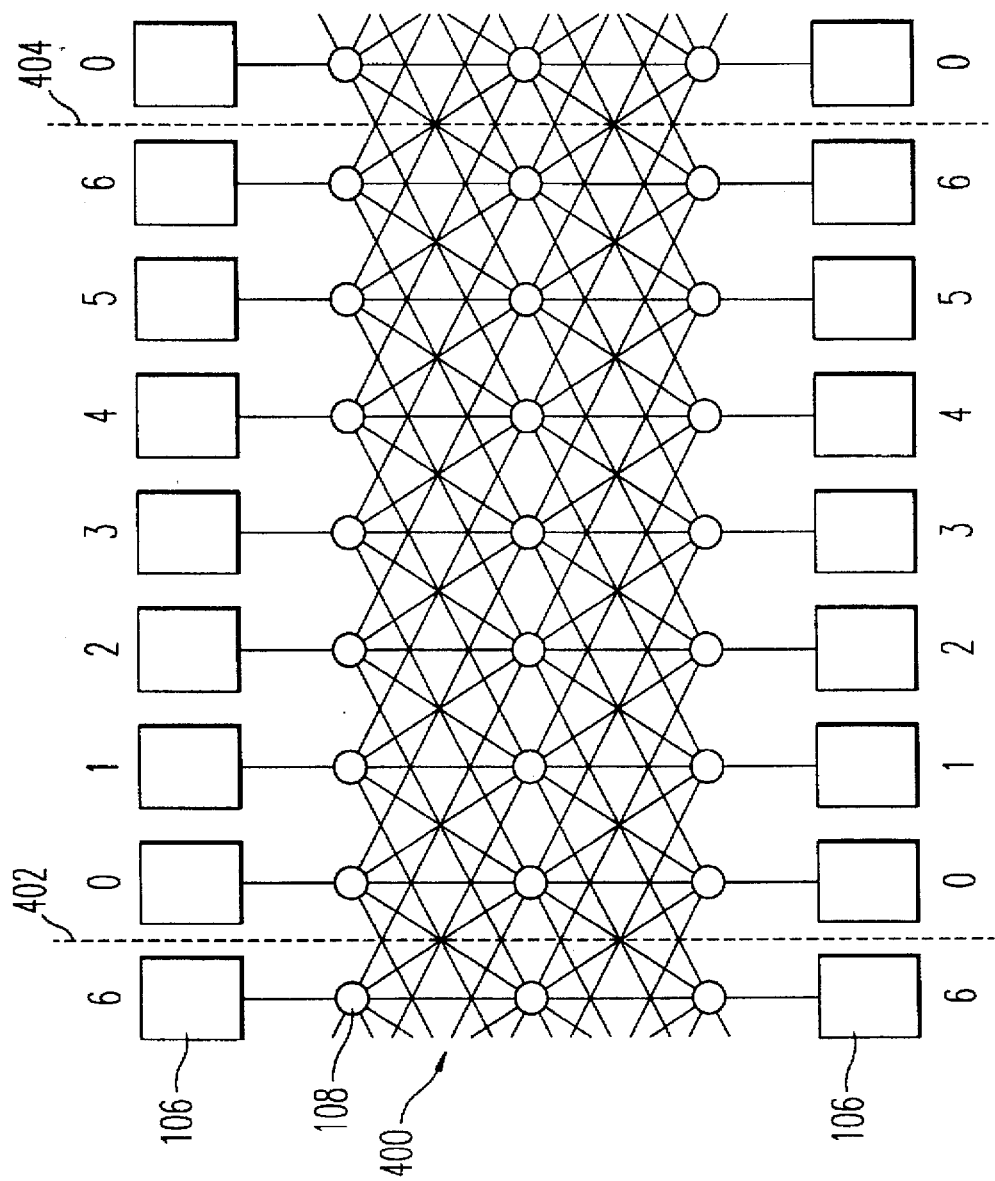
FIG. 4 is a block diagram illustrating a bipartite interconnection structure in a two-dimensional view.

Referring to FIG. 4, there is shown a block diagram illustrating a bipartite interconnection structure 400 in a two-dimensional view. The bipartite structure 400 is a particular case of the interconnection structure of FIGS. 1–2. Specifically, the bipartite graph (also known as $K_{N,N}$ graph) has equal numbers of vertices in the first and last rows. The bipartite interconnection structure 400 ensures that information exchanges between each of the N information elements 106 of the upper row and each of the N information elements 106 of the lower row, and vice versa.

Topologically these information elements 106 and nodes 108 are placed on the cylindrical surface 104 (FIG. 1). In a manner similar to that of FIG. 2, the bipartite interconnection structure 400 is shown in FIG. 4 in a linear configuration and repeated, so that all information elements 106 and nodes 108 to the left of a left broken line 402, and to the right of a right broken line 404 are the same information elements 106 and nodes 108 with corresponding numbers that are between the lines 402 and 404.

The bipartite interconnection structure 400 includes a preselected number N of information elements 106, a plurality of nodes 108, and a plurality of connecting lines 110. The plurality of nodes 108 are arranged in a regular array having the preselected number N of columns and having three rows. Each node (1,j) of the second row is coupled to the nodes 108 ([j+$d_i$](Mod N)) of the first and third (outer) rows for i=0, 1, . . . , n by n+1 connecting lines 110. As above, the numbers $d_i$ are components of a Perfect Difference Set of order n. The preselected number N of columns equals $n^2+n+1$.

Each of the plurality of information elements 106 is coupled to a corresponding node (0,j), for j=0, 1, . . . , N−1. Of course some nodes 108 may not have information elements 106 coupled to them. The outer nodes 108 are coupled to respective ones of the information elements 106. In particular, each node (0,j) of row 0 is coupled to one of the plurality of information elements 106 by the connecting lines 110. Likewise, each node (2,j) of row 2 is coupled to information elements j by the connecting lines 110. The nodes 108 in row 0 and row 2 may be integral with a bi-directional node 108. Likewise, the information elements 106 coupled to the row 0 of the nodes 108 and the information elements 106 coupled to the row 2 of the nodes 108 may be integral with a transmiting and receiving information element 106.

Figure 5:
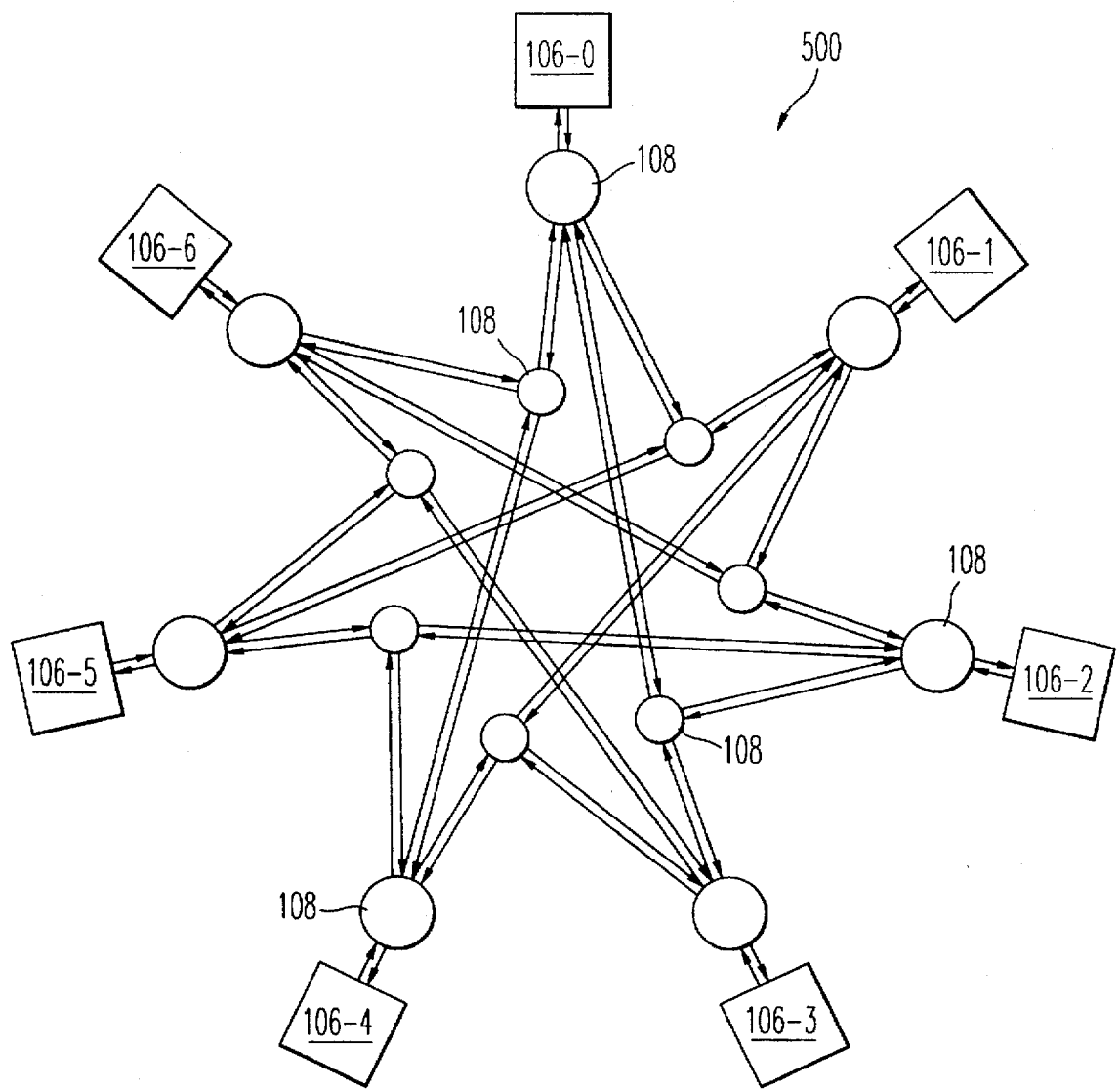
FIG. 5 is a block diagram illustrating an interconnection structure of a complete hyperstar structure.

Referring to FIG. 5, there is shown a block diagram illustrating a complete hyperstar interconnection structure 500. To generate the complete interconnection structure 500, the upper information elements 106 are considered to be transmiters of information, and lower information elements 106 are considered to be receivers. The complete hyperstar structure is realized by wrapping-around the interconnection structure of FIG. 4 to combine the transmitting information elements 106 and the receiving information elements 106 into a transmitter-receiver information element and to combine nodes 108 into bi-directional nodes 108. The resulting configuration is a torus. The interconnection structure 500 shows three rows of nodes 108 with the nodes of rows 0 and 2 combined into a bi-directional node 108.

The complete interconnection structure 500 includes a preselected number N of information elements 106, a plurality of nodes 108, and a plurality of connecting lines 110. The plurality of nodes is arranged in a regular array having the preselected number N of columns and having to rows. Each node (0,j) of the first row is coupled to an information element j by bi-directional connecting lines 110, for j=0, 1, . . . ,n. Each node (0,j) is also coupled to the nodes 108 (1,j) of the second row ([j+di](Mod N)) by n+1 bi-directional connecting lines 110, for i=0, 1 , . . . , n. As before, the integers $d_i$ are components of a Perfect Difference Set of order n. The preselected number N of columns equals $n^2+n+1$.

For the known fully connected network, the total number of links is proportional to N×(N−1). In contrast, in the present invention, the number of links is proportional to only N×(n+1). Taking into account that in the interconnection of the present invention, $N=n^2+n+1$, and thus, for large values of N, (which are of most interest), a coefficient of the diminishing of number of interconnections $C_c$ is proportional to $N^{1/2}$. Table VI shows proportional values of interconnecting links for these two cases for various values of n and N.

TABLE VI

| n | N | Full graph | New Structure | $C_c$ |
|---|---|---|---|---|
| 2 | 7 | 21 | 21 | 1 |
| 3 | 13 | 78 | 52 | 1.5 |
| 4 | 21 | 231 | 105 | 2.2 |
| 5 | 31 | 465 | 186 | 2.5 |
| 7 | 57 | 1596 | 465 | 3.5 |
| 8 | 73 | 2628 | 657 | 4.0 |

Improvement of the characteristic is considerable even for relatively small number of nodes 108, and increases dramatically for large numbers. For example, a system with 9507 nodes 108 has $C_c$=50.

Maximal improvement of characteristics is achieved when the real number of nodes N' is equal to N; the number N itself does not take all values from the natural row (see Table VII). However, the leaps of N are not large (and significantly less than in the case of the hypercube architecture). Excessive connections in the case N'<N can be either eliminated or used to increase system reliability.

TABLE VII

| n | N | $\Delta(N_i/N_{i-1})\%$ |
|---|---|---|
| 2 | 7 | — |
| 3 | 13 | 86 |
| 4 | 21 | 60 |
| 5 | 31 | 48 |
| 7 | 57 | 83 |
| 8 | 73 | 28 |
| 9 | 91 | 25 |
| 11 | 133 | 46 |
| 13 | 183 | 36 |
| 16 | 273 | 49 |
| 17 | 307 | 12 |
| 19 | 381 | 13 |
| 23 | 553 | 45 |
| 25 | 651 | 18 |
| 27 | 757 | 16 |
| 29 | 871 | 15 |
| 31 | 993 | 14 |
| 32 | 1057 | 7 |
| 37 | 1407 | 33 |
| 41 | 1723 | 23 |
| 43 | 1893 | 10 |
| 47 | 2257 | 19 |
| 49 | 2451 | 9 |
| 53 | 2863 | 16 |
| 59 | 3541 | 19 |
| 61 | 3783 | 7 |
| 64 | 4161 | 10 |
| 67 | 4557 | 10 |
| 71 | 5113 | 11 |
| 73 | 5403 | 7 |
| 79 | 6321 | 17 |
| 81 | 6643 | 8 |
| 83 | 6973 | 5 |
| 97 | 9507 | 19 |

As shown in Table VII, for large N, the leaps between values of N do not exceed 20%. In contrast, for a hypercube architecture, the leap always is equal to 100%. Another, and much more important difference between the structures of the present invention and the hypercube architecture is that, in the former, the connection between any nodes 108 in adjacent rows is always achieved in one hop, and the "skew" is equal to zero. As a result, the exchange between information elements 106 is performed with minimal possible delay, and all delays are equal. It makes interconnection structure of the present invention very convenient, particularly for the use in integrated circuits and multiprocessor computer systems design.

The total complexity of the interconnection structure depends on the complexity of the nodes 108 that form the whole array. These nodes 108 in the general case have number of inputs proportional to (n+1) which are used for interconnection of nodes 108 with one another, as well as additional inputs for the information elements 106 (transmitters-receivers of information).

Information elements 106 can be connected to any node in the general array.

In the most general case, to avoid the effect of blocking (a conflict situation when several information element use the same interconnecting node), these nodes 108 must have the ability to interconnect simultaneously a number of links that is proportional to (n+1). This requires a large number of switches and leads to the serious complication of the structure in general. Fortunately, in practice the number of information elements 106 interconnecting through any node is significantly less and proportional to only m, where:

$$m < (n+1) \tag{4}$$

Thus, the interconnection structure may include nodes that are substructures having the ability to interconnect m of (n+1) inputs, where m<(n+1).

This fact follows from the general considerations based on the theory of probabilities and is confirmed by computer simulations.

An example is given in the Table VII for n=32, N=1057 for an experiment with a total number of trials of 1000.

TABLE VII

| Number of paths through node | Number of trials with this number of paths | Fraction of trials |
|---|---|---|
| 0 | 324 | 32% |
| 1 | 414 | 41% |
| 2 | 198 | 20% |
| 3 | 54 | 5% |
| 4 | 10 | 1% |
| 5–33 | 0 | 0% |

As a result, in practical applications instead of a complex system that is able to fully interconnect up to 33 inputs/outputs, we can use a dramatically simpler node that is able to interconnect only 4 to 5 of the total number of links, thereby requiring far fewer switching elements.

The interconnection structure may comprise a set of hierarchical nodes 108 with the hierarchical nodes 108 further comprising hierarchical nodes 108 of different levels with the orders and numbers of inputs according to the sequence:

$$[n_1, N_1; n_2, N_2; \ldots; n_q, N_q; \ldots] \tag{5}$$

where $n_{q+1} \leq N_q$.

Such an interconnection structure includes a plurality of hierarchical nodes 108 (sub-structures) arranged in a regular array having a preselected number $N_a$ columns and having a preselected number S rows. Each node (s,j) is coupled to nodes 108 (s−1, [j+d_i](Mod $N_a$)) by $n_a$+1 connecting lines 110, for i=0, 1, . . . , $n_a$, and also is coupled to nodes 108 (s+1, (j+d_i)(Mod $N_a$)) by $n_a$+1 connecting lines 110, for i=0, 1, . . . , $n_a$. As before, $d_i$ are components of a Perfect Difference Set of order $n_a$. The preselected number $N_a$ of columns equals $n_a^2 + n_a + 1$.

Any of the plurality of hierarchical nodes 108 further includes a plurality of hierarchical nodes 108 arranged in a regular array having a preselected number $N_b$ columns and having a preselected number S' rows. Each node (s,j) is coupled to nodes (s'−1, [j+d_i](Mod $N_b$)) by $n_b$+1 connecting lines 110, for i=0, 1, . . . , $n_b$, and is coupled to node (s'+1, (j+d_i)(Mod $N_b$)) by $n_b$+1 connecting lines 110, for i=0, 1, . . . , $n_b$. Again, $d_i$ are components of a Perfect Difference Set of order $n_b$ and the preselected number $N_b$ of columns equals $n_b^2 + n_b + 1$. The order $n_b$ of the lower level of the hierarchical set and the preselected number $N_b$ of columns are selected from the sequence defined above in equation (5).

Generally, the type of the intermediate substructures and the number of hierarchical levels can vary depending on the total number of nodes 108 and requirements to the principles of the exchange information between them. Sometimes it is possible to use a simple substructure, up to the direct connection or simplest commutator-multiplexer. These structures can be considered a particular case of the general solution of the interconnection problem.

The hyperstar interconnection structure combines most of the advantages of well known architectures, such as the fully connected system and the hypercube architecture, and at the same time is free of most of their shortcomings. It is unique in combination of high speed of information exchange, low number of interconnecting links and a reasonable number of switching elements. This structure is a real landmark in the theory and practice of node interconnections.

I claim:

1. A method of interconnecting a plurality of nodes, the method comprising the steps of:

selecting an order n;

selecting a Perfect Difference Set comprising the set of $\{d_0, d_1, \ldots d_n\}$;

arranging a plurality of nodes in a regular array having a preselected number N columns and having a preselected number S rows, the preselected number $N = n^2 + n + 1$;

coupling each node (s,j) to nodes (s−1, [j+d_i](Mod N)) for i=0, 1, . . . , n; and coupling each node (s,j) to nodes (s+1, [j+d_i](Mod N)) for i=0, 1, . . . , n.

2. The method of claim 1 further comprising the step of:

coupling information elements to nodes (s,j), for s=0, 1, . . . , S, and j=0, 1, . . . , N−1.

3. An interconnection structure comprising:

a plurality of nodes arranged in a regular array having a preselected number N columns and having a preselected number S rows, each node (s,j) being coupled to nodes (s−1, [j+d_i](Mod N)), for i=0, 1, . . . , n, and being coupled to nodes (s+1, (j+d_i)(Mod N)), for i=0, 1, . . . , n, where $d_i$ are components of a Perfect Difference Set of order n and the preselected number N of columns equals $n^2 + n + 1$.

4. The interconnection structure of claim 3 further comprising a plurality of connecting lines providing said coupling between nodes.

5. The interconnection structure of claim 3 further comprising a plurality of information elements, each of the plurality of information elements being coupled to any of the nodes (s,j), for s=1, 2, . . . , S and j=0, 1, . . . , N−1.

6. The interconnection structure of claim 5 further comprising a plurality of connecting lines providing said coupling between nodes and between nodes and the plurality of information elements.

7. The interconnection structure of claim 5 wherein each information element comprises a transmitter and a receiver.

8. The interconnection structure of claim 3 wherein any of the plurality of nodes comprises a plurality of substructures of order n' and a number N' of inputs, where $N'=n'^2+n'+1$ and $n' \leq N$.

9. An interconnection structure comprising:

a plurality of hierarchical nodes arranged in a regular array having a preselected number $N_a$ columns and having a preselected number S rows, each node (s,j) being coupled to nodes (s−1, [j+d_i](Mod $N_a$)), for i=0, 1, ..., $n_a$, and being coupled to node (s+1, (j+d_i)(Mod $N_a$)), for i=0, 1, ..., $n_a$, where $d_i$ are components of a Perfect Difference Set of order $n_a$ and the preselected number $N_a$ of columns equals $n_a^2+n_a+1$, any of the plurality of hierarchical nodes comprising a plurality of hierarchical nodes arranged in a regular array having a preselected number $N_b$ columns and having a preselected number S' rows, each node (s,j) being coupled to node (s'−1, [j+d_i](Mod $N_b$)), for i=0, 1, ..., $n_b$, and being coupled to node (s'+1,(j+d_i)(Mod $N_b$)), for i=0, 1, ..., $n_b$, where $d_i$ are components of a Perfect Difference Set of order $n_b$ and the preselected number $N_b=n_b^2+n_b+1$, the number $n_b \leq N_a$.

10. A bipartite interconnection structure comprising:

a preselected number 2N of information elements; and a plurality of nodes arranged in a regular array having the preselected number N of columns and having three rows, each node (0,j) of the first row and each node (2,j) of the third row being coupled to one of the plurality of information elements, each node of the second row (1,j) being coupled to the nodes of the first and second rows ([j+di](Mod N)) for j=0, ...,N and i=0, 1, ...,n, where $d_i$ are components of a Perfect Difference Set of order n and the preselected number N of columns equals $n^2+n+1$.

11. A complete hyperstar interconnection structure comprising:

a preselected number N of information elements; and a plurality of nodes arranged in a regular array having the preselected number N of columns and having two rows, each node (0,j) of the first row being coupled to nodes of the second row (1,(j+d_i)(Mod N)), for j=0, 1, ...,N and i=0, 1, ..., n, where $d_i$ are components of a Perfect Difference Set of order n, and the preselected number N of columns equals $n^2=n+1$.

12. The interconnection structure of claim 11 wherein for j=0, ..., N, node (0,j) and node (1,j) are integral with a bi-directional node j.

* * * * *